(12) United States Patent
Colombo et al.

(10) Patent No.: US 12,327,129 B2
(45) Date of Patent: Jun. 10, 2025

(54) PROCESSING SYSTEM, RELATED INTEGRATED CIRCUIT, DEVICE AND METHOD

(71) Applicants: STMicroelectronics Application GMBH, Aschheim-Dornach (DE); STMicroelectronics International N.V., Geneva (CH)

(72) Inventors: Roberto Colombo, Munich (DE); Vivek Mohan Sharma, New Delhi (IN)

(73) Assignees: STMicroelectronics Application GMBH, Aschheim-Dornach (DE); STMicroelectronics International N.V., Geneva (CH)

( * ) Notice: Subject to any disclaimer, the term of this patent is extended or adjusted under 35 U.S.C. 154(b) by 599 days.

(21) Appl. No.: 17/657,856

(22) Filed: Apr. 4, 2022

(65) Prior Publication Data
US 2022/0334865 A1  Oct. 20, 2022

(30) Foreign Application Priority Data
Apr. 16, 2021  (IT) .......................... 102021000009683

(51) Int. Cl.
*G06F 11/00* (2006.01)
*G06F 9/455* (2018.01)
*G06F 11/07* (2006.01)

(52) U.S. Cl.
CPC ...... *G06F 9/45558* (2013.01); *G06F 11/0712* (2013.01); *G06F 11/0772* (2013.01); *G06F 11/0793* (2013.01); *G06F 2009/45591* (2013.01)

(58) Field of Classification Search
CPC ............ G06F 11/0712; G06F 11/0772; G06F 11/0793; G06F 9/45558
See application file for complete search history.

(56) References Cited

U.S. PATENT DOCUMENTS

2008/0016407 A1* 1/2008 Abernathy .......... G06F 11/3672
714/45
2016/0210069 A1  7/2016 Utas et al.
(Continued)

FOREIGN PATENT DOCUMENTS

EP         3534261 B1    11/2020
WO      2010007469 A1    1/2010

OTHER PUBLICATIONS

Anonymous, "AN4247 Application note Safety Manual for SPC570S family", www.st.com/resource/en/application_note/dm00076080-safety_manual-for-spec570s-family-stmicroelectronics.pdf, XP055868927, Jul. 23, 2015, pp. 13-16.

*Primary Examiner* — Elmira Mehrmanesh
(74) *Attorney, Agent, or Firm* — Slater Matsil, LLP

(57) ABSTRACT

A processing system includes safety monitoring circuits configured to generate error signals by monitoring a microprocessor operations, a memory controller, and/or a resource. The system further includes fault collection sub-circuits, each including one or more error combination circuits, each including a first programmable register and being configured to receive a subset of the error signals, determine whether an error signal is asserted, and store to the first register error status data that identifies the asserted error signal. Each error combination circuit is configured to read enable data from the first register and generate a combined error signal based on the error status and enable data. The error management circuit includes a second programmable register and is configured to receive the combined error signals, read routing data from the second register, and generate for each microprocessor an error signal based on the combined error signals and routing data.

20 Claims, 8 Drawing Sheets

(56) References Cited

U.S. PATENT DOCUMENTS

2019/0272210 A1\* 9/2019 Colombo ............ G06F 11/0721
2020/0150970 A1   5/2020 Evans et al.

\* cited by examiner

PROCESSING SYSTEM, RELATED INTEGRATED CIRCUIT, DEVICE AND METHOD

CROSS-REFERENCE TO RELATED APPLICATIONS

This application claims the benefit of Italian Patent Application No. 102021000009683, filed on Apr. 16, 2021, which application is hereby incorporated herein by reference.

TECHNICAL FIELD

Embodiments of the present disclosure relate to the error management within processing systems, such as microcontrollers.

BACKGROUND

FIG. 1 shows a typical electronic system, such as the electronic system of a vehicle, comprising a plurality of processing systems 10, such as embedded systems or integrated circuits, e.g., a Field Programmable Gate Array (FPGA), a Digital Signal Processor (DSP) or a microcontroller (e.g., dedicated to the automotive market).

For example, in FIG. 1 are shown three processing systems 101, 102 and 103 connected through a suitable communication system 20. For example, the communication system may include a vehicle control bus, such as a Controller Area Network (CAN) bus, and possibly a multimedia bus, such as a Media Oriented Systems Transport (MOST) bus, connected to vehicle control bus via a gateway. Typically, the processing systems 10 are located at different positions of the vehicle and may include, e.g., an Engine Control Unit, a Transmission Control Unit (TCU), an Anti-lock Braking System (ABS), a Body Control Module (BCM), and/or a navigation and/or multimedia audio system. Accordingly, one or more of the processing systems 10 may also implement real-time control and regulation functions. These processing systems are usually identified as Electronic Control Units.

FIG. 2 shows a block diagram of an exemplary digital processing system 10, such as a micro-controller, which may be used as any of the processing systems 10 of FIG. 1.

In the example considered, the processing system 10 comprises a microprocessor 102, usually the Central Processing Unit (CPU), programmed via software instructions. Usually, the software executed by the microprocessor 102 is stored in a non-volatile program memory 104, such as a Flash memory or EEPROM. Thus, the memory 104 is configured to store the firmware of the processing unit 102, wherein the firmware includes the software instructions to be executed by the microprocessor 102. Generally, the non-volatile memory 104 may also be used to store other data, such as configuration data, e.g., calibration data.

The microprocessor 102 usually has associated also a volatile memory 104b, such as a Random-Access-Memory (RAM). For example, the memory 104b may be used to store temporary data.

As shown in FIG. 2, usually the communication with the memories 104 and/or 104b is performed via one or more memory controllers 100. The memory controller(s) 100 may be integrated in the microprocessor 102 or connected to the microprocessor 102 via a communication channel, such as a system bus of the processing system 10. Similarly, the memories 104 and/or 104b may be integrated with the microprocessor 102 in a single integrated circuit, or the memories 104 and/or 104b may be in the form of a separate integrated circuit and connected to the microprocessor 102, e.g., via the traces of a printed circuit board.

In the example considered, the microprocessor 102 may have associated one or more (hardware) resources/peripherals 106 selected from the group of:

one or more communication interfaces IF, e.g., for exchanging data via the communication system 20, such as a Universal asynchronous receiver/transmitter (UART), Serial Peripheral Interface Bus (SPI), Inter-Integrated Circuit ($I^2C$), Controller Area Network (CAN) bus, and/or Ethernet interface, and/or a debug interface; and/or one or more analog-to-digital converters AD and/or digital-to-analog converters DA; and/or one or more dedicated digital components DC, such as hardware timers and/or counters, or a cryptographic co-processor; and/or one or more analog components AC, such as comparators, sensors, such as a temperature sensor, etc.; and/or one or more mixed signal components MSC, such as a PWM (Pulse-Width Modulation) driver.

Generally, a dedicated digital components DC may also correspond to a FPGA integrated in the processing system 10. For example, in this case, the memory 104 may also comprise the program data for such a FPGA.

Accordingly, the digital processing system 10 may support different functionalities. For example, the behavior of the microprocessor 102 is determined by the firmware stored in the memory 104, e.g., the software instructions to be executed by a microprocessor 102 of a micro-controller 10. Thus, by installing a different firmware, the same hardware (micro-controller) can be used for different applications.

In this respect, future generation of such processing systems 10, e.g., microcontrollers adapted to be used in automotive applications, are expected to exhibit an increase in complexity, mainly due to the increasing number of requested functionalities (new protocols, new features, etc.) and to the tight constraints of execution conditions (e.g., lower power consumption, increased calculation power and speed, etc.).

For example, recently more complex multi-core processing systems 10 have been proposed. For example, such multi-core processing systems may be used to execute (in parallel) several of the processing systems 10 shown in FIG. 1, such as several ECUs of a vehicle.

FIG. 3 shows an example of a multi-core processing system 10. Specifically, in the example considered, the processing system 10 comprises a plurality of n processing cores $102_1 \ldots 102_n$ connected to a (on-chip) communication system 114. For example, in the context of real-time control systems, the processing cores $102_1 \ldots 102_n$ may be ARM Cortex®-R52 cores. Generally, the communication system 114 may comprise one or more bus systems, e.g., based on the Advanced eXtensible Interface (AXI) bus architecture, and/or a Network-on-Chip (NoC).

For example, as shown at the example of the processing core 1021, each processing core 102 may comprise a microprocessor 1020 and a communication interface 1022 configured to manage the communication between the microprocessor 1020 and the communication system 114. Typically, the interface 1022 is a master interface configured to forward a given (read or write) request from the microprocessor 1020 to the communication system 114, and forward an optional response from the communication system 114 to the microprocessor 1020. However, the communication interface 1022 may also comprise a slave interface.

For example, in this way, a first microprocessor $1020$ may send a request to a second microprocessor $1020$ (via the communication interface $1022$ of the first microprocessor, the communication system $114$ and the communication interface $1022$ of the second microprocessor).

Generally, each processing core $102_1 \ldots 102_n$ may also comprise further local resources, such as one or more local memories $1026$, usually identified as Tightly Coupled Memory (TCM).

As mentioned before, typically the processing cores $1021 \ldots 102n$ are arranged to exchange data with a non-volatile memory $104$ and/or a volatile memory $104b$. In a multi-core processing system $10$, often these memories are system memories, i.e., shared for the processing cores $102_1 \ldots 102_n$. As mentioned before, each processing cores $102_1 \ldots 102_n$ may, however, comprise one or more additional local memories $1026$.

For example, as shown in FIG. 3, the processing system $10$ may comprise one or more memory controllers $100$ configured to connect at least one non-volatile memory $104$ and at least one volatile memory $104b$ to the communication system $114$. As mentioned before, one or more of the memories $104$ and/or $104b$ may be integrated in the integrated circuit of the processing system $10$ or connected externally to the integrated circuit. For example, the processing system $10$ may comprise:

a first volatile memory $104b$ integrated in the integrated circuit of the processing system $10$ and connected to the communication system $114$ via a first memory controller $100$, and a second volatile memory $104b$ external with respect to the integrated circuit of the processing system $10$ and connected to the communication system $114$ via a second memory controller $100$.

As mentioned before, the processing system $10$ may comprise one or more resources $106$, such as one or more communication interfaces or co-processors (e.g., a cryptographic co-processor). The resources $106$ are usually connected to the communication system $114$ via a respective communication interface $1062$. In general, the communication interface $1062$ comprises at least a slave interface. For example, in this way, a processing core $102$ may send a request to a resource $106$ and the resource returns given data. Generally, one or more of the communication interfaces $1062$ may also comprise a respective master interface. For example, such a master interface may be useful in case the resource has to start a communication in order to exchange data via (read and/or write) request with another circuit connected to the communication system $114$, such as a resource $106$ or a processing core $102$. For example, for this purpose, the communication system $114$ may indeed comprise an Advanced Microcontroller Bus Architecture (AMBA) High-performance Bus (AHB), and an Advanced Peripheral Bus (APB) used to connect the resources/peripherals $106$ to the AMBA AHB bus.

Often such processing systems $10$ comprise also one or more Direct Memory Access (DMA) controllers $110$. For example, as shown in FIG. 3, a DMA controller $110$ may be used to directly exchange data with a memory, e.g., the memory $104b$, based on requests received from a resource $106$. For example, in this way, a communication interface IF may directly read data (via the DMA controller $110$) from the memory $104b$ and transmit these data, without having to exchange further data with a processing unit $102$. Generally, a DMA controller no may communicate with the memory or memories via the communication system $114$ or via one or more dedicated communication channels.

In this respect, irrespective of the complexity of the processing system $10$ (e.g., with respect to the number of processing cores $102$ and/or number and type of the resources $106$), a typical processing system $10$ comprises also fault collection and error management circuit $120$.

For example, European patent application n. EP 3 534 261 A1 discloses possible embodiments of a fault collection and error management circuit $120$, which is incorporated herein by reference for this purpose.

Specifically, as shown in FIG. 4, at least one of the circuits $102$, $104$ and $106$ may generate one or more error signals $ERR_1, \ldots, ERR_m$. For example, such error signals ERR may be generated by at least one of:

a memory $104$ supporting an error detection and/or correction function, which generates an error signal $ERR_1$ when the data read from the memory $104$ contain errors and/or when data could not be written to the memory;

a processing core $102$ configured to generate an error signal $ERR_2$ in response to a hardware and/or software failure; and a communication interface configured to generate an error signal $ERR_3$, corresponding to a hard error signal indicative of a hardware failure and/or a soft error signal indicative of a data transmission error.

Additionally, one or more error signals may be generated by monitoring the supply voltage of the processing system $10$ (e.g., in order to detect over and/or under voltage conditions), the clock signal of the processing system $10$ (e.g., in order to detect whether the clock frequency is out of range), and/or the temperature of the processing system $10$ (e.g., in order to detect whether the current operating temperate is out of range).

In the example considered, the various error signals $ERR_1, \ldots, ERR_m$ are provided to the fault collection and error management circuit $120$. In response to the error signals $ERR_1, \ldots, ERR_m$, the fault collection and error management circuit $120$ may execute various operations.

For example, the fault collection and error management circuit $120$ may be configured to generate at least one of:

an interrupt signal IRQ provided to a processing core $102$;

a reset request signal RST provided to a reset management circuit of the processing system $10$;

a signal ET provided to a terminal EP of the processing system $10$, e.g., in order to signal the error to an external circuit; and a signal SET used to set the output level of one or more safety critical terminals SCP of the processing system $10$.

Specifically, due to an error, the circuits of the processing system $10$ may not operate correctly, possibly generating incorrect signals at the pins/pads of the processing system $10$. Some of the pins/pads of the processing system $10a$ may thus be safety-critical pins/pad, i.e., pins/pads which may generate critical situations when driven incorrectly. For example, in FIG. 4 is shown schematically a first safety-critical pin $SCP_1$, which is driven by a processing core $102$, and a second safety-critical pin $SCP_2$, which is driven by a resource/peripheral $106$, such as a communication interface or a PWM half-bridge driver.

Generally, each input/output pin/pad of the processing system $10$ has usually associated a respective driver circuit IO, which is configured to drive the respective pin/pad as a function of the signal received from the respective block, e.g., the processing system $102$ and the hardware resources $106$. Generally, between the driver circuits IO and the blocks of the processing system $10a$ may also be arranged a dedicated logic, such as one or more multiplexers, permitting a configuration of the pin-mapping.

Accordingly, in line with the disclosure of document EP 3 534 261 A1, the driver circuit IO of a safety-critical pins/pads SCP may be configured to set the output level of the respective pin to a given safety state in response to a signal SET. The output level, such as a high-impedance state or a given logic level (high or low), may depend on the specific application needs. Preferably such a "safety state" is compliant to the ISO2626 specification.

FIG. 5 shows a possible implementation of the fault collection and error management circuit 120.

In the example considered, the fault collection and error management circuit 120 comprises a register 1200. Specifically, in the example considered, the register 1200 comprises one or more error bits EB for storing the value of the error signals ERR. For example, considering the exemplary case of three error signals $ERR_1 \ldots ERR_3$, the register 1200 may comprise a corresponding number of error bits EB.

In the example considered, the fault collection and error management circuit 120 comprises an internal reaction circuit 1202. Specifically, the internal reaction circuit 1202 may be configured to generate the interrupt signal IRQ and/or the reset request signal RST as a function of the content of the error bits EB of the register 1200. The error bits EB are purely optional and the external reaction circuit 1202 may generate the interrupt signal IRQ and/or the reset request signal RST also directly as a function of the error signal(s) ERR.

Similarly, the fault collection and error management circuit 120 comprises an external reaction circuit 1204. Specifically, the external reaction circuit 1204 may be configured to generate the error trigger signal ET and/or the signal SET as a function of the content of the error bits EB of the register 1200. Again, the error bits EB are purely optional and the external reaction circuit 1204 may generate the signal ET and/or the signal SET also directly as a function of the error signal(s) ERR.

In general, the behavior of the reaction circuits 1202 and/or 1204 may also be programmable, e.g., by setting one or more configuration bits in the register 1200. For example, in the example considered, the register 1200 comprises:

a respective interrupt enable bit IE for each of the error signals $ERR_1 \ldots ERR_3$, i.e., the interrupt signal IRQ is asserted when also the respective interrupt enable bit IE of an asserted error signal ERR is asserted;

a respective error trigger enable bit ETE for each of the error signals $ERR_1 \ldots ERR_3$, i.e., the error trigger signal ET is asserted when also the respective error trigger enable bit ETE of an asserted error signal ERR is asserted.

Similarly, the register 1200 may comprise respective reset enable bits for the reset request signal REQ and/or respective enable bits for the safety signal SET.

In order to simplify the data exchange between the processing unit 102 and the registers 1200, the register 1200 may be directly addressable by the processing unit 102, which is schematically shown in FIG. 3, where the fault collection and error management circuit 120 is connected to the communication system 114.

As mentioned before, the fault collection and error management circuit 120 may receive a significant number or error signals ERR from different circuits of the processing system. For example, this applies in particular to complex multi-core processing systems 10. For example, in the context of automotive applications, multiple functionalities, such as braking, airbag control, powertrain, etc., may be integrated on the same processing system. However, in this context, also the safety requirements prescribed by the ISO26262 specification have to be satisfied.

Typically, as shown in FIG. 6, the hardware error signals ERR are generated by dedicated safety monitor circuits SM. For example, such safety monitor circuits may comprise combinational and/or sequential logic circuits, which monitor the operation of a given circuit. Generally, such safety monitor circuits SM may also comprise analog components, e.g., in order to detect an out-of-range condition for an analog signal, such as an internal supply voltage or a signal indicative of the operating temperature of the processing system or a specific circuit of the processing system.

For example, FIG. 6 shows a safety monitor circuit $SM_{104}$ configured to monitor one or more signals of the memory 104, a safety monitor circuit $SM_{102}$ configured to monitor one or more signals of a processing core 102 and a safety monitor circuit $SM_{106}$ configured to monitor one or more signals of a resource/peripheral 106. Generally, the safety monitor circuit may also be integrated in the respective circuit.

Accordingly, typically each safety monitor circuit SM monitors one or more signals generated by and/or provided to the associated circuit, and determines whether the behavior of the signal(s) is normal or indicates an error. In general, the operations performed by a given safety monitor circuit SM depend on the associated circuit and may include, e.g.:

a combinational analysis, e.g., by combining the signals of the associated circuit in order to determine whether the signal levels are congruent;

a sequential analysis, e.g., by comparing the time evolution of one or more signals with one or more reference signals;

an analysis of one or more analog signals, e.g., by comparing the value of an analog signal with one or more reference values; or a combination of the above analyses in order to implement a more complex abnormal behavior analysis.

For example, as mentioned before, the safety monitor circuit $SM_{104}$ may correspond to an error detection circuit of the memory 104, which calculates (via combinational and optionally sequential logic operations) an error correction code for the data read from the memory and compares (via combinational logic operations) the calculated error correction code with an error correction code read from the memory. Conversely, the safety monitor circuit $SM_{102}$ may comprise a watch-dog timer configured to generate an error signal when the associated processing core does not reset the watch-dog timer in a given period of time.

Accordingly, in response to determining an abnormal behavior, the safety monitor circuit SM may assert a respective error signal ERR, which signals the error to the fault collection system 120.

However, when increasing the functionality of the processing system 10, e.g., with respect to the number and/or features of the processing cores 102 and/or the resources, also the number n of error signals ERR increases. Such a solution may thus be rather inefficient in terms of area, e.g., because the area of the fault collection and management circuit 120 increases proportionally to the number n of error signals ERR to be managed.

SUMMARY

In view of the above, it is an objective of various embodiments of the present disclosure to provide solutions for managing error signals within a processing system.

According to one or more embodiments, one or more of the above objectives is achieved by means of a processing system having the features specifically set forth in the claims that follow. Embodiments moreover concern a related integrated circuit, device and method.

The claims are an integral part of the technical teaching of the disclosure provided herein.

As mentioned before, various embodiments of the present disclosure relate to a processing system. The processing system comprises a plurality of microprocessors programmable via software instructions, a memory controller configured to read the software instructions from a non-volatile memory, at least one resource/peripheral and a communication system connecting the processing core to the memory controller and the resource(s).

In various embodiments, a plurality of safety monitoring circuits is configured to generate a plurality of error signals by monitoring the operation of the microprocessors, the memory controller and/or the resource(s). Accordingly, a fault collection and error management circuit is configured to receive the plurality of error signals from the plurality of safety monitoring circuits, and generate one or more reaction signals as a function of the plurality of error signals.

Specifically, in various embodiments, the fault collection and error management circuit comprises a plurality of fault collection sub-circuits and an error management circuit.

In various embodiments, each fault collection sub-circuit comprises one or more error combination circuits, wherein each error combination circuit comprises a first register programmable via software instructions executed by a microprocessor. For example, each first register may be connected to the communication system and have associated a respective physical address, wherein a first register may be programmed by sending a write request to the communication system comprising the respective physical address.

In various embodiments, each error combination circuit is configured to receive a subset of the error signals, determine whether one or more of the received error signals are asserted, and in response to determining that one or more of the received error signals are asserted, store error status data to the first register, wherein the error status data identify the one or more asserted error signals. In various embodiments, each error combination circuit is moreover configured to read enable data from the first register, wherein the enable data specify for each error signal whether a combined error signal should be asserted when the respective error signal is asserted, and generate the combined error signal as a function of the error status data and the enable data, i.e., assert the combined error signal when an error signal is asserted and the respective enable data specify that the combined error signal should be asserted. Accordingly, in various embodiments, a microprocessor may program the enable data in order to specify which errors should be signaled via a combined error signal and may read the error status data in order to determine which error was (or which errors were) asserted.

In various embodiments, the error management circuit comprises a second register programmable via software instructions executed by a microprocessor. For example, also the second register may be connected to the communication system and have associated a respective physical address, wherein the second register may be programmed by sending a write request to the communication system comprising the respective physical address.

In various embodiments, the error management circuit is configured to receive the combined error signals from the error combination circuits, read routing data from the second register, wherein the routing data specify for each combined error signal and for each microprocessor whether an error should be signaled to the respective microprocessor when the respective combined error signal is asserted, and generate for each microprocessor a respective signal, such as an interrupt or exception signal, used to signal an error as a function of the combined error signals and the routing data, i.e., assert the signal when a combined error signal is asserted and the routing data specify for the respective combined error signal that the error should be signaled to the microprocessor. Accordingly, in various embodiments, a microprocessor may program the routing data in order to specify which combined error signals should be signaled to each microprocessor.

Specifically, such a solution is particularly useful for processing systems configured to execute a hypervisor and one or more virtual machines. In fact, in this way, the routing data stored to the second register and the enable data associated with a first set of error signals may be programmable by the hypervisor, while the enable data associated with respective sets of error signals may be programable by each virtual machine.

For example, in order to control the access rights to the first and second registers, the processing system may comprise one or more hardware address protection circuits configured to selectively forward write request generated by a microprocessor to the first registers of the error combination circuit or the second register as a function of virtual address translation data and/or access-rights data. For example, in various embodiments, a respective hardware address protection circuit, such as a Memory Management Unit or a Memory Protection Unit, is associated with each microprocessor. In this case, the hypervisor may be configured to program at least in part the virtual address translation data and/or access-rights data for each microprocessor.

For example, in case of virtual machines, each microprocessor may have associated a register for storing a Virtual Machine ID, and the hardware address protection circuit may be configured to use virtual address translation data and/or access-rights as a function of the Virtual Machine ID stored to this register. Accordingly, in this case, the hypervisor may be configured to associate with each virtual machine a respective Virtual Machine ID, program for each Virtual Machine IDs respective virtual address translation data and/or access-rights data (which limit the access to the first registers and the second register), determine for each microprocessor whether a virtual machine should be executed, and program the respective Virtual Machine ID to the register associated with the microprocessor and start the respective virtual machine on the microprocessor.

Generally, the fault collection sub-circuits may receive thus system error signals, error signals relating to a specific microprocessor or virtual machine, or shared resources. Accordingly, based on whether the processing system is a custom or a general-purpose processing system, the error signals may be assigned differently.

For example, one or more fault collection sub-circuit may be associated with the hypervisor, i.e., the processing system is configured to permit access to this fault collection sub-circuit only via the microprocessor executing the hypervisor. For example, this fault collection sub-circuit may comprise one or more error combination circuits configured to receive system error signals and/or error signals generated by one or more safety monitoring circuits configured to monitor the operation of shared memories and/or shared resources.

Additionally or alternatively, each microprocessor (or virtual machine) may have associated a respective fault collection sub-circuit comprising one or more error combination circuits configured to receive error signals generated by one or more safety monitoring circuits configured to monitor the operation of the respective microprocessor (or the microprocessor or microprocessors configured to execute the virtual machine). In various embodiments, these error combination circuits may also receive error signals generated by one or more safety monitoring circuits configured to monitor the operation of a resource and/or memory area associated (already during the hardware design stage) with the respective microprocessor (or virtual machine).

Accordingly, in this case, each microprocessor (or each microprocessor executing a given virtual machine) may program the first registers of the respective fault collection sub-circuit, e.g., the hypervisor may be configured to program the virtual address translation data and/or access-rights data, such that each microprocessor (or each microprocessor executing a given virtual machine) may access the first registers of the one or more error combination circuits of the fault collection sub-circuit associated with the microprocessor (or the virtual machine). Moreover, the hypervisor may configure the routing data stored to the second register in order to forward the combined error signals to the associated microprocessor(s), e.g., the hypervisor may be configured to program the routing data stored to the second register in order to forward the combined error signals generated by the one or more error combination circuits of a fault collection sub-circuit associated with a microprocessor (or virtual machine) to the respective microprocessor (or one or more of the microprocessors configured to execute the virtual machine).

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In the following FIGS. 7 to 13 parts, elements or components which have already been described with reference to FIGS. 1 to 6 are denoted by the same references previously used in such Figure; the description of such previously described elements will not be repeated in the following in order not to overburden the present detailed description.

Figure 1:
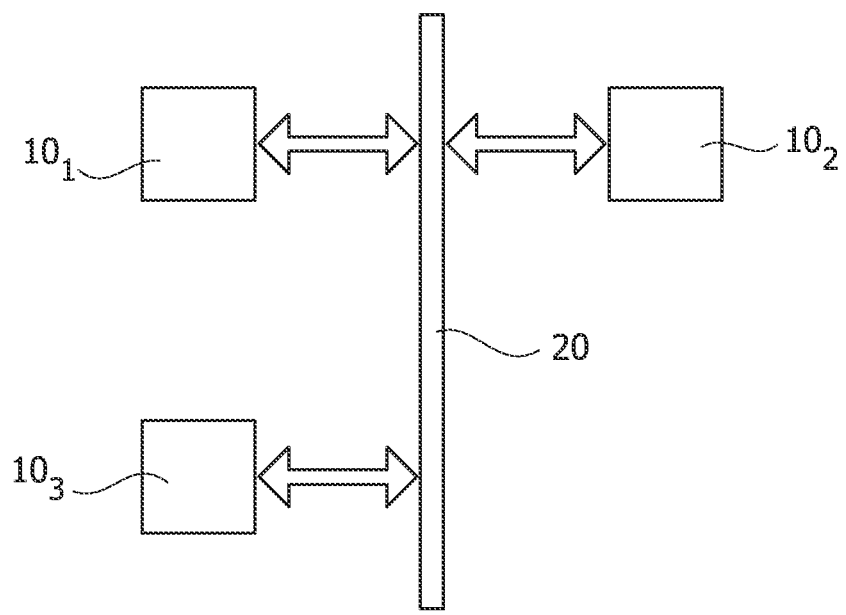
FIG. 1 shows an example of an electronic system comprising a plurality of processing systems.
Figure 2:
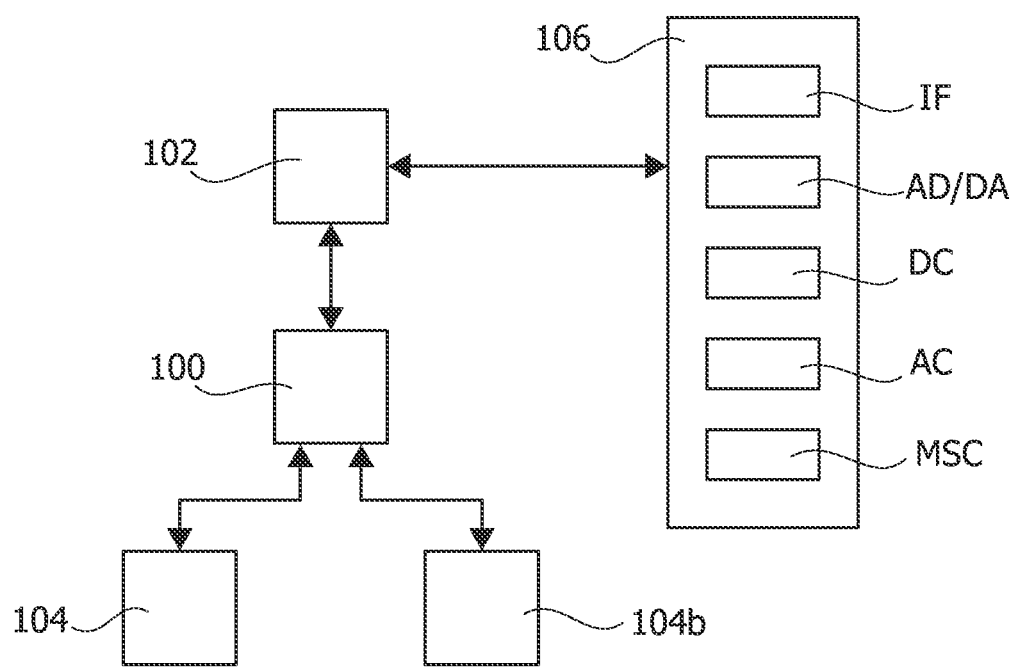
FIGS. 2 and 3 show examples of processing systems.
Figure 3:
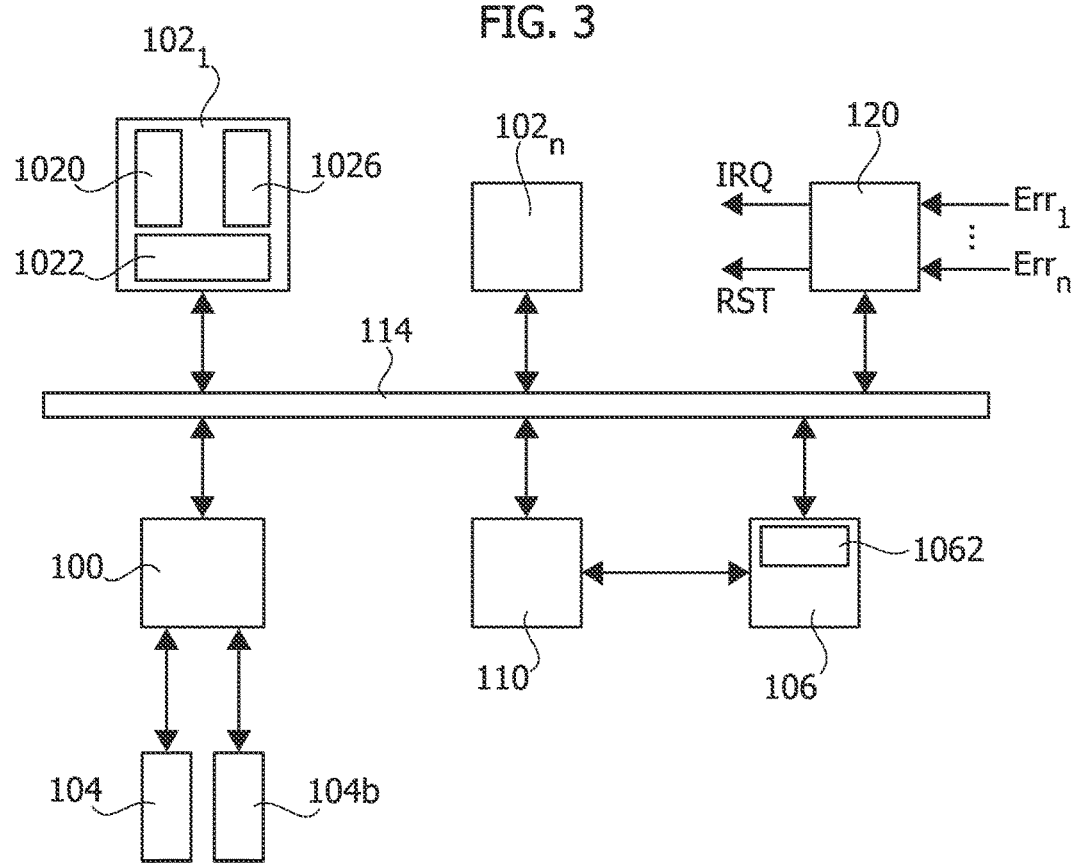
Figure 4:
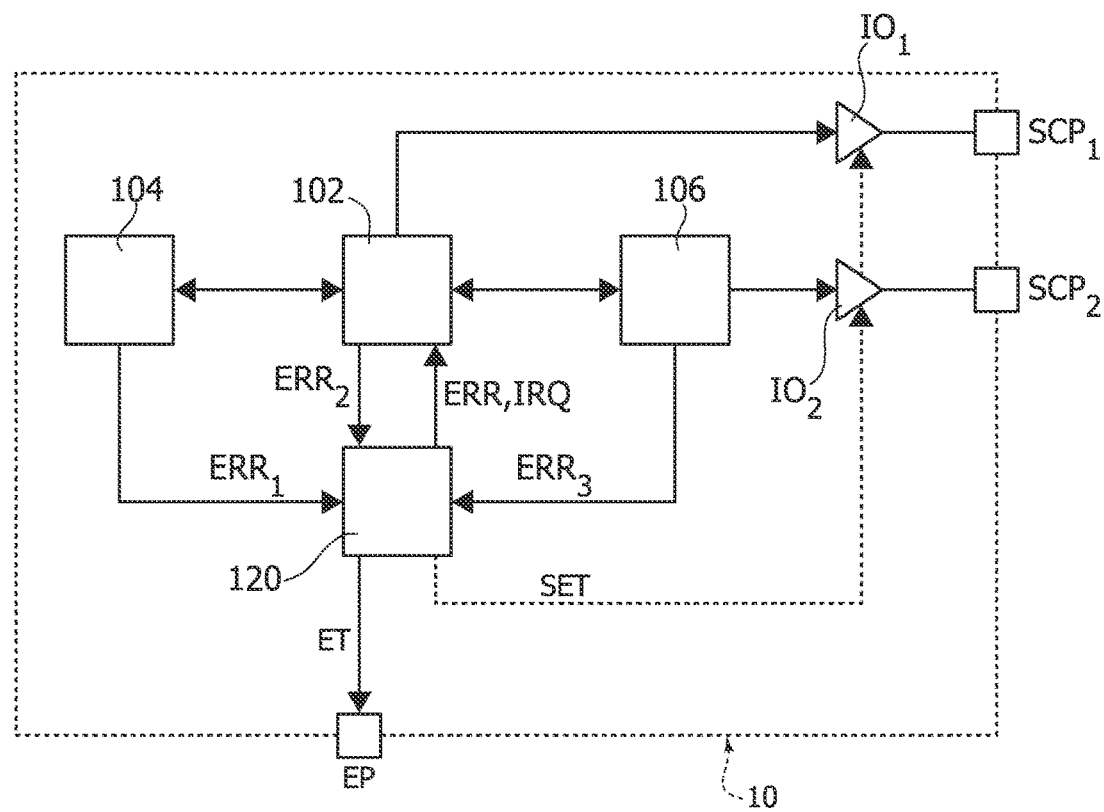
FIG. 4 shows an example of a processing system comprising a fault collection and error management circuit.
Figure 5:
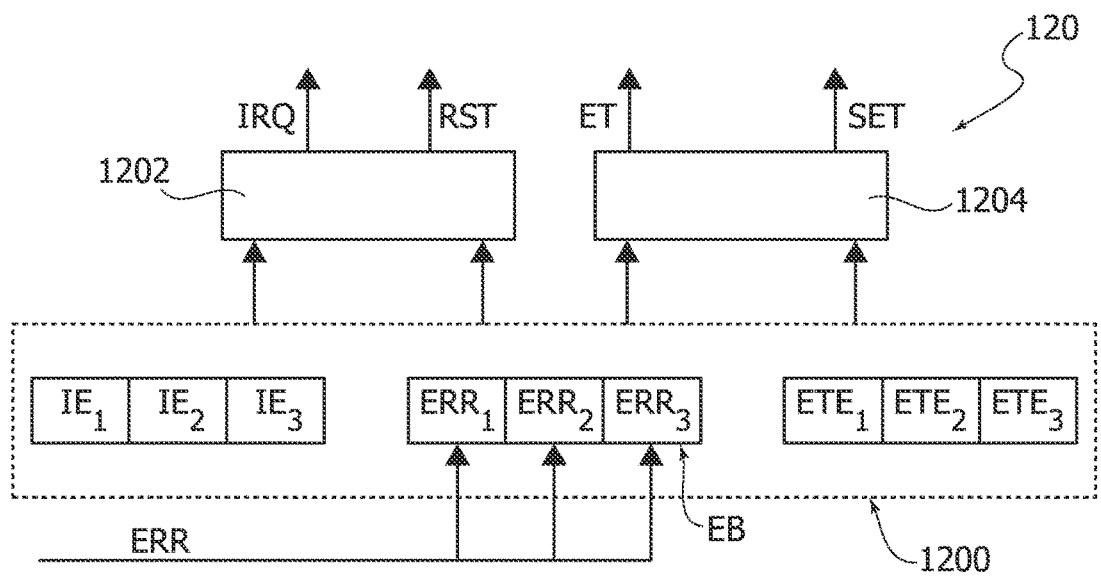
FIG. 5 shows an example of the fault collection and error management circuit of FIG. 4.
Figure 6:
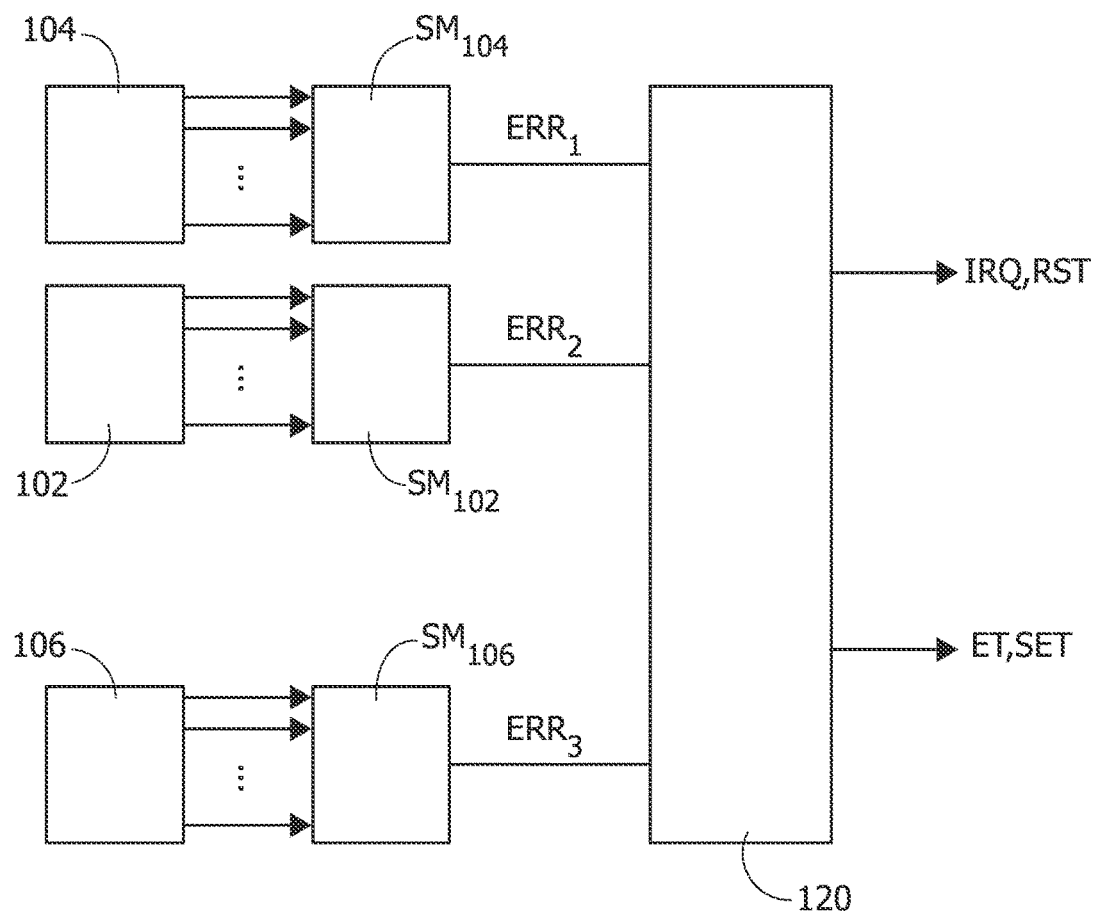
FIG. 6 shows an example of the connection between a plurality of safety monitoring circuits and the fault collection and error management circuit.
Figure 7:
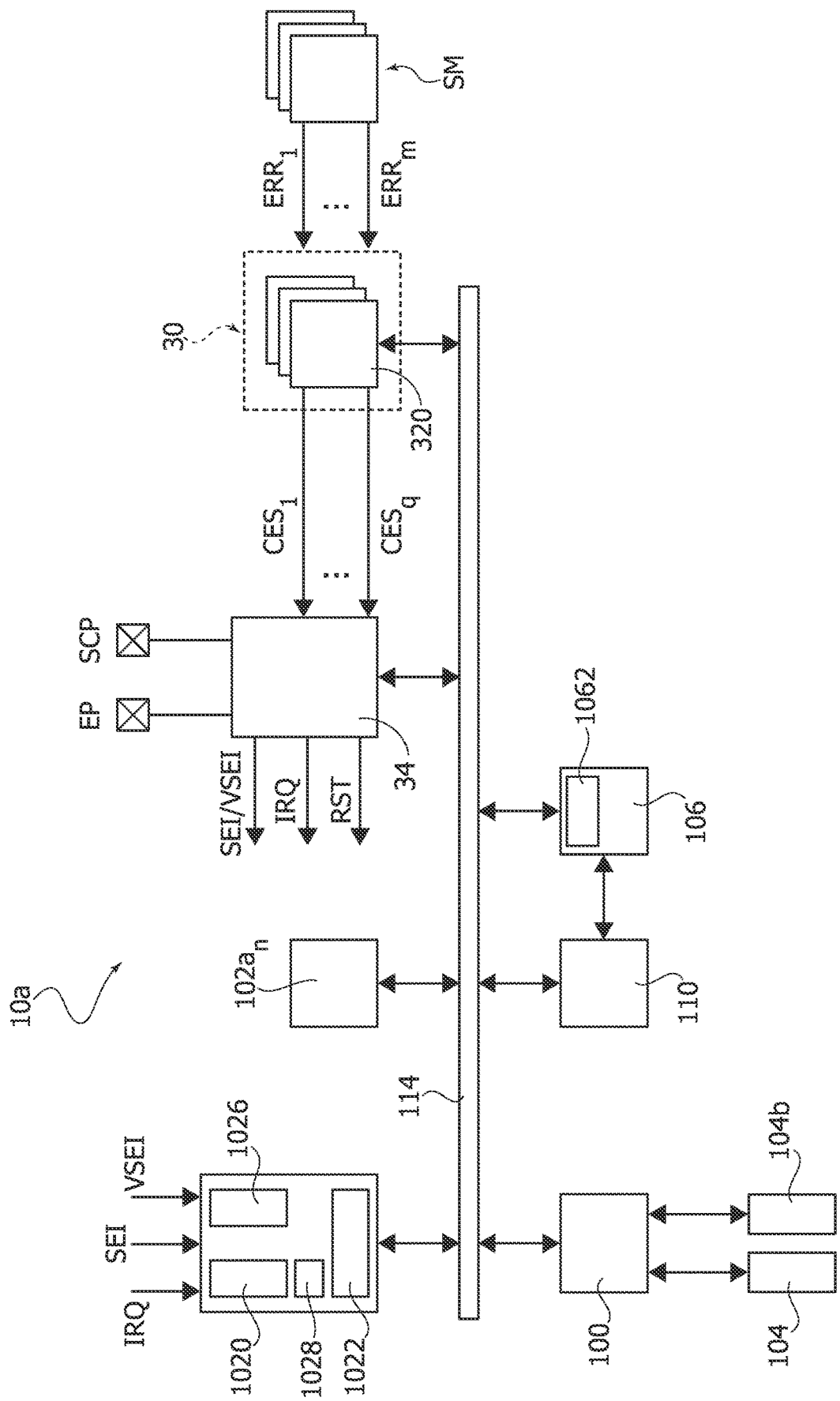
FIG. 7 shows an embodiment of a processing system comprising a fault collection circuit and an error management circuit.

FIG. 7 shows an embodiment of a processing system 10a according to the present description.

In the embodiment considered, the underlying architecture of the processing system 10a corresponds to the processing system described with respect to FIGS. 1 to 6, and the respective description applies in their entirety. Thus, also in this case, the processing system 10a, such as an integrated circuit, comprises:

a communication system 114, such as a bus or NoC;

at least one processing core 102a, such as processing cores $102_{a1}, \ldots 102_{an}$, wherein each processing core comprises at least one microprocessor 1020 and at least one communication interface 1022 configured to connect the microprocessor(s) 1020 to the communication system 114;

at least one memory controller 100 configured to be connected to a (internal or external) non-volatile memory 104 and/or a volatile memory 104b;

optional further circuits, such as one or more resources/peripherals 106 and/or DMA controllers 110.

As described in the foregoing, a significant number of error signals ERR, e.g., error signals $ERR_1, \ldots, ERR_m$, may have to be managed within the processing system 10a. Specifically, such error signals ERR are generated by safety monitoring circuits SM, which analyses the behavior of an associated circuit, such as a processing core 102, a memory controller 100 or a resource/peripheral 106. Generally, also a plurality of safety monitoring circuits SM may be associated with the same circuit and monitor different potential errors, such as one or more safety monitoring circuits monitoring different memory ranges of a memory 104 or 104b. Typically, such safety monitoring circuits SM are positioned near or are even integrated in the associated circuit.

In this context, the inventors have observed that the forwarding of the various error signals ERR from the safety monitoring circuits SM (which are distributed within the processing system) to a centralized fault collection and error management circuit 120 may be rather inefficient. In fact, on the one hand, the fault collection and error management circuit 120 has to support a corresponding number of error signals, which increases also the size of the fault collection and error management circuit 120. On the other hand, each error signal ERR has to be provided via a respective trace to a respective input of the fault collection and error management circuit 120, which may thus involve a complex wiring within the processing system.

Accordingly, in order to reduce the number of inputs of the fault collection and error management circuit and the wiring within the processing system, the processing system may comprise a fault collection and management circuit, which is split into two circuits:

a fault collection circuit 30 comprising a plurality of error combination circuits 320; and a fault management circuit 34.

For example, the various error combination circuits 320, such as error combination circuits $320_1, \ldots, 320_p$, wherein each error combination circuits 320 is configured to generate a combined error signal CES by combining a plurality of error signals ERR via a combinational logic operation, e.g., via a logic OR operation. Accordingly, in this case, each combined error signal CES, such as combined error signals $CES_1, \ldots, CES_p$, may be provided to a respective input of the error management circuit 34. Accordingly, the error combination circuits 320 may be positioned near the respective safety monitoring circuits SM.

While this solution reduces the problem of the size of the fault collection and error management circuit and the wiring of the error signals ERR, this solution introduces other problems.

For example, based on the combinational logic operation used within such error combination circuits 320, the combined error signal CES generated by an error combination circuits 320 may be stuck to a given logic level when one (or more) of the received error signals ERR itself are stuck to a given logic level, e.g., set to high in case of a logic OR operation. For example, a given error signal ERR may be asserted, either because the respective safety monitor circuit SM has detected an error or due to a malfunction of the safety monitor circuit SM itself. However, this implies that a trigger in another error signal ERR managed by the same error combination circuit 320 may be masked, which would reduce the overall safety coverage.

Moreover, the error management circuit 34 is not anymore able to distinguish the error signals ERR having been combined into the respective combined error signal CES. Accordingly, in order to distinguish the errors again, either the safety monitor circuits SM and/or the fault collection sub-circuit 32 have to comprise a register used to store the error state, wherein the register is readable, e.g., via software instructions executed on a processing core 102.

Furthermore, by using a simple logic gate, the addition and integration of new safety monitors SM, which might also have different error trigger characteristics, may require a modification of the error management circuit 34. This modification may not be desired, e.g., because the error management circuit 34 may be an IP design, which has already been tested.

The inventors have also observed that, on top of these problems, modern processing systems move towards the concept of software tasks, wherein the processing system 10a may execute several software tasks, e.g., by executing in sequence tasks on the same processing core 102a and/or in parallel on a plurality of processing cores 102a. However, such tasks may execute rather different operations. Accordingly, from a safety and/or security point of view, each task should have only given access rights.

Generally, each processing core 102a may access other circuits by sending read or write requests REQ via the respective interface 1022 to the communication system 114, wherein the request comprises a physical address associated with the target circuit, such as a memory controller, a resource 106 or even another processing core 102a. Accordingly, the processing systems 10 may manage access rights by controlling via software and/or hardware the transmission of such requests to the communication system 114.

Figure 8:
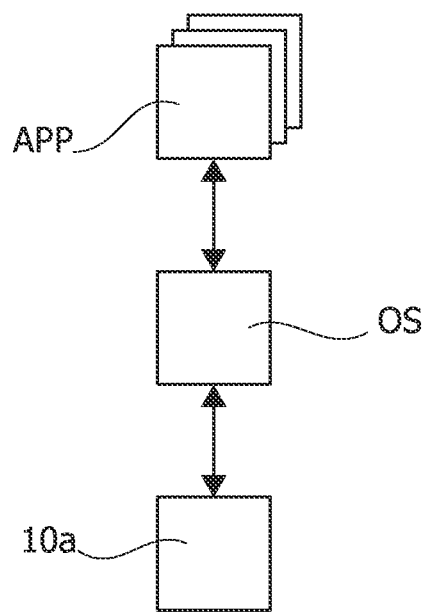
FIG. 8 shows an embodiment of the software executed by the processing system, wherein the software is divided into an operating system and applications.

For example, as shown in FIG. 8, often such access rights are implemented by separating the software tasks into tasks of an operating system OS and tasks of applications APP executed by the operating system OS.

Specifically, in a software protection mechanism, all read and write requests of an application APP have to pass through the operating system OS, which thus may determine whether an application APP may send a request to a given target address.

Conversely, in a hardware address protection, each processing core 102a (or even each microprocessor 1020 in case the processing core 102a comprises plural microprocessors) comprises or has associated a hardware address protection circuit 1028 (see also FIG. 7), such as a Memory Management Unit (MMU) or Memory Protection Unit (MPU), which manages the forwarding of the read or write requests generated by the processing core 102 to the communication system 114, e.g., the forwarding of a read or write requests generated by a respective microprocessor 1020 to the communication interface 1022.

Specifically, a Memory Management Unit (MMU), which is used in a Virtual Memory System Architecture (VMSA), such as an ARM AArch64 architecture, permits to configure (e.g., via the operating system OS) one or more translation tables (TTB). Specifically, a translation table permits to map a given virtual address to a respective physical address or a further virtual address. Specifically, this mapping of virtual addresses (VA) to physical addresses (PA) of the communication system 114, possibly via various translation tables for different exception levels, is implemented directly within the hardware MMU of the processing core 102a or the microprocessor 1020. Thus, it is possible to control the access rights of a given software task by defining the mapping of a virtual address range used by a software task executed by a microprocessor 1020 to the actual physical address range of the communication system 114, e.g., the MMU may be configured to:

when the request received by a microprocessor 1020 comprises a virtual address specified in the translation table, convert the virtual address into a respective physical address and forward the modified request to the communication system 114; or when the request received by a microprocessor 1020 comprises a virtual address not specified in the translation table, reject the request.

Conversely, a Memory Protection Unit (MPU), which is used in a Protected Memory System Architecture (PMSA), such as an ARM AArch32 architecture with PMSA, does not perform an address translation. Specifically, in this case, instead of defining the mapping of virtual addresses to physical addresses, the MPU permits to specify, e.g., via one or more access-right tables, directly the physical addresses/ address ranges a software task executed by a microprocessor 1020 may access, e.g., the MPU may be configured to:
- when the request received by a microprocessor 1020 comprises a physical address specified in the access-rights table, forward the request to the communication system 114; or
- when the request received by a microprocessor 1020 comprises a physical address not specified in the access-rights table, reject the request.

Figure 9:
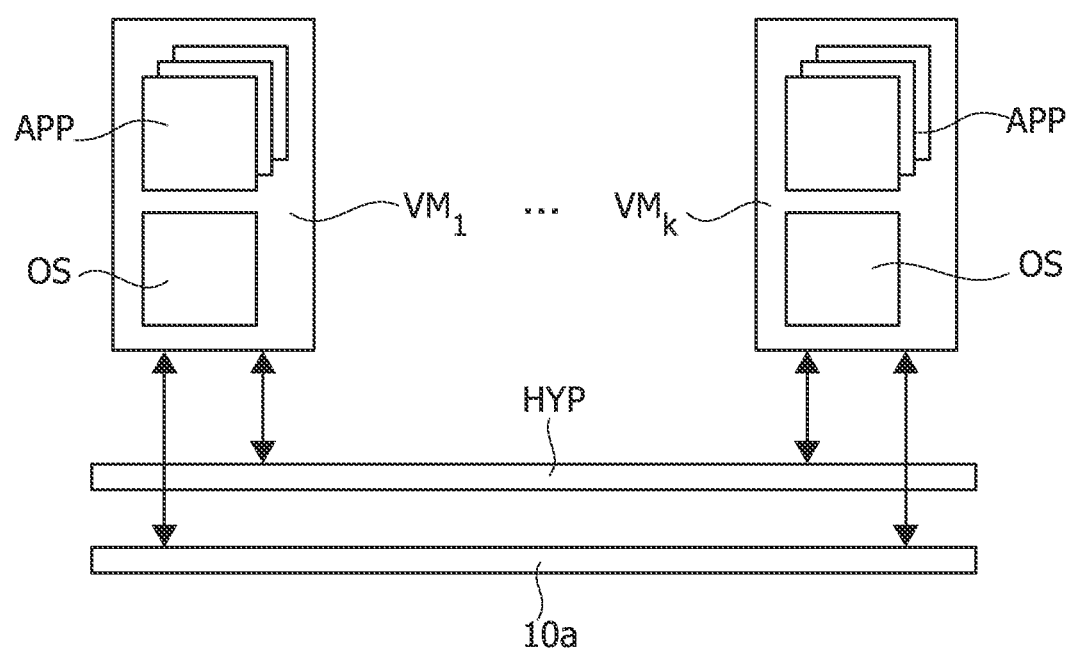
FIG. 9 shows an embodiment of the software executed by the processing system, wherein the software is divided into a hypervisor and a plurality of virtual machines.

FIG. 9 shows moreover that recently it has been proposed to perform a virtualization, wherein a hypervisor HYP is executed by the processing system 10a. Specifically, the hypervisor HYP essentially corresponds to a particular software layer, which permits the configuration of a plurality of k virtual machines $VM_1, \ldots, VM_k$, wherein each virtual machine VM may execute respective software tasks, such as a respective operating system OS and one or more respective applications APP.

Thus, when using a VMSA architecture, each virtual machine $VM_1 \ldots VM_k$ may have associated a respective virtual address range, so called Intermediate Physical Addresses (IPA). Similarly, when using an PMSA architecture, each virtual machine $VM_1 \ldots VM_k$ may have associated a respective physical address range. For example, such virtual machine translation tables or access-rights tables are typically implemented in the exception level $EL_2$. For example, in the ARM architecture, selection of the current rules based on the virtual machine translation table(s) or access-rights table(s) may be performed as a function of:
- a value Virtual Machine ID (VMID) identifying the virtual machine currently executed by a given microprocessor 1020, wherein the VMID is typically set by the hypervisor HYP; and
- a value Address Space ID (ASID) identifying a given software task (e.g., a specific application) or group of software tasks (e.g., tasks of the operating system), wherein the ASID is typically set by the operating system OS.

Generally, the value VMID is usually required, because a given microprocessor 1020 is not necessarily associated univocally to given respective virtual machine. For example, a plurality of virtual machines may be executed (via a time scheduling scheme) on the same processing core 102a or a given virtual machine may be executed (in parallel or sequentially) by a plurality of microprocessor 1020. Substantially, the hypervisor HYP may set the respective VMID of a given microprocessor 1020 when switching from one virtual machine to another.

Accordingly, the hypervisor HYP may assign access rights to given physical address ranges to each virtual machine VM by configuring the translation table(s) of an MMU or the access-rights table(s) of an MPU. Similarly, also other master interfaces, e.g., of a DMA controller no or a resource 106, may send read or write request to the communication system 114 via a System Memory Management Unit (SMMU) or a System Memory Protection Unit (SMPU). Thus, also in this case, the hypervisor HYP may assign access rights to given physical address ranges to each master interface by configuring the translation table(s) of a SMMU or the access-rights table(s) of a SMPU. For example, in this way, given resources 106 and/or given address ranges managed by a memory controller 100 may be assigned univocally to a given virtual machine VM or the hypervisor HYP. For example, in this way, the hypervisor HYP may configure the processing system 10a such that a given resource 106, e.g., a communication interface, is only accessible by a first virtual machine, but not by a second virtual machine.

However, as described in the foregoing, when using fault collection sub-circuits 32, indeed the detailed information concerning the information, which error signal ERR has triggered a given combined error signal CES, is stored in a register of the respective safety monitor circuit or the respective error combination circuit 320.

However, usually it is impossible to block via the protection circuit 1028 access to single bits of a register associated with a given physical address. Accordingly, the only way to limit the access of a given virtual machine to these error bits, and thus the respective register bits, resides in blocking the access for all virtual machines and permitting the access only for the hypervisor HYP, which thus may provide the respective error information to the virtual machine VM associated with the circuit having generated the error signal.

However, this implies that a significant delay may be introduced between the instant when an error is signaled by a safety monitor circuit SM, the error is signaled via an interrupt IRQ to the microprocessor 1020 and the instant when the respective virtual machine VM indeed obtains the information, which error was signaled.

In order to solve the above problems, in various embodiments of the present disclosure, the fault collection circuit 30 and the fault management circuit 34 are configured in a specific manner, which simplifies the management of the error signals ERR, in particular in the context of a multi-core processing system 10a, e.g., used to execute a plurality of k virtual machines VM.

Figure 10:
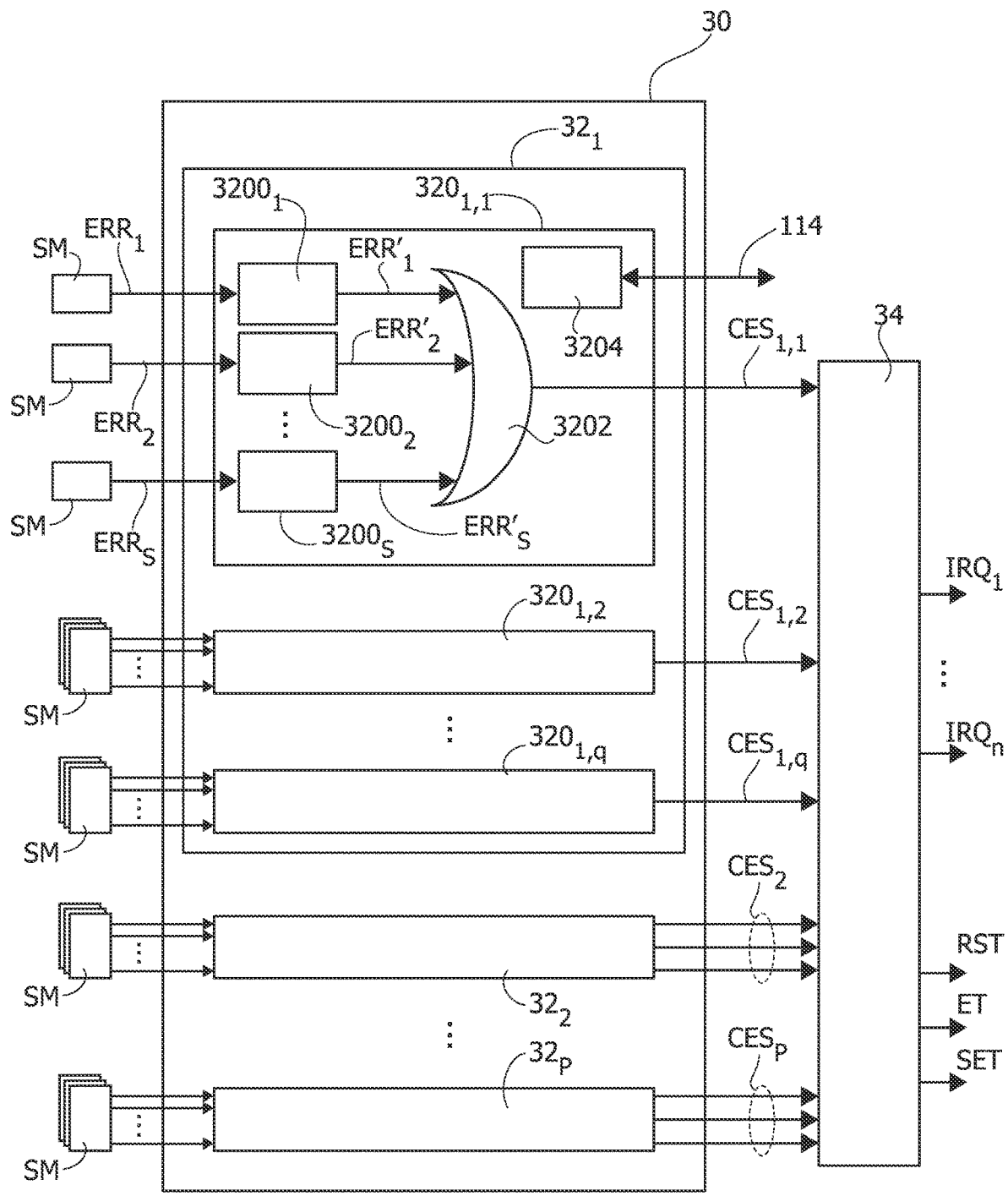
FIG. 10 shows an embodiment of the fault collection circuit and the error management circuit of FIG. 7.

Specifically, as shown in FIG. 10, in various embodiments, the fault collection circuit 30 comprising a plurality of fault collection sub-circuit 32, also identified as Combined Error Manager (CEM) circuit in the following. For example, in the embodiment considered, the fault collection circuit 30 comprises a number p of fault collection sub-circuit $32_1, \ldots, 32_p$.

Specifically, as will be described in greater detail in the following the number p of fault collection sub-circuit 32 corresponds to or is greater than:
- the number of microprocessors 1020 of the processing system 10a, e.g., n in case each processing core 102a comprises a single microprocessor 1020; or
- the number k of virtual machines VM configured to be executed in parallel on the processing system 10a.

In fact, this permits that with each virtual machine VM or each microprocessor 1020 is associated a respective fault collection sub-circuit 32.

In various embodiments, the processing system 10a may comprise a further fault collection sub-circuit 32 associated with the hypervisor HYP.

In various embodiments, the processing system 10a may comprise also a further fault collection sub-circuit 32, which may manage system errors not being specifically associated with a specific virtual machine VM or processing core 102a, such as errors being associated with monitored clock signals, supply voltages, temperature, etc.

In various embodiments, each fault collection sub-circuit/CEM circuit 32 comprises one or more programmable error combination circuits 320, e.g., a number q of error combination circuits $320_{1,1}, \ldots, 320_{1,q}$ for the fault collection sub-circuit 321. Specifically, each error combination circuits 320 is configured to generate a respective combined error signal CES, e.g., a combined error signals $CES_{1,1}, \ldots, CES_{1,q}$ for the error combination circuits $320_{1,1}, \ldots, 320_{1,q}$.

Specifically, in various embodiments, each error combination circuits 320 generates the respective combined error signal CES as a function of the received error signals ERR and a first set of configuration data. In various embodiments, the programmable error combination circuits 320 may be distributed within the processing systems 102a, e.g., position near the safety monitoring circuits SM generating the respective error signals.

As shown in FIG. 10, in various embodiments, each error combination circuits 320 receives a given number of s of error signals, e.g., error signals $ERR_1, \ldots, ERR_s$. Generally, the number s of error signals ERR may be different for the error combination circuits 320 of a given fault collection sub-circuit 32 and/or may be different for the error combination circuits 320 of a different fault collection sub-circuit 32.

Specifically, as mentioned before, in various embodiments, a respective fault collection sub-circuit 32 may be associated with each virtual machine VM or each microprocessor 1020. Accordingly, in various embodiments, the error signals ERR provided to a given fault collection sub-circuit 32 comprise the error signals ERR being of potential interest for the respective virtual machine VM or microprocessor 1020.

For example, in various embodiments, a fault collection sub-circuit 32 may be associated univocally with each microprocessor 1020, wherein each sub-circuit 32 comprises one or more error combination circuits 320 configured to collect the errors associated with the respective microprocessor 102, such as errors generated by monitoring the respective microprocessor 1020 (see, e.g., the safety monitoring circuit $SM_{102}$ in FIG. 6), errors generated by monitoring predetermined memory ranges in the memory 104 and/or 104b assigned to the microprocessor 1020 (see, e.g., the safety monitoring circuit $SM_{104}$ in FIG. 6), and/or errors generated by monitoring respective components in the processing core 102a, such as the memory 1026, the protection unit 1028 and/or the interface 1022. In fact, this is usually sufficient, because each microprocessor 1020 executes, at a given instant, only a respective virtual machine VM, wherein also a plurality of micro-processors 1020 may be assigned to the same virtual machine, i.e., each microprocessor 1020 is associated, at the given instant, univocally with a respective virtual machine.

Concerning other resources/peripherals 106, such resources may be assigned univocally to a given microprocessor 1020 or the assignment may be programmable, e.g., by specifying the access rights as described with respect to the protection unit 1028.

Thus, in case of a custom processing system 10a, where the virtual machines VM have assigned predetermined resources 106, also the error signals relating to resources 106 received by the various fault collection sub-circuit 32 may be different.

Conversely, in case of a general-purpose processing system 10a, various solutions may be adopted.

In a first solution, the error signals generated for one or more resources 106 are managed by a fault collection sub-circuit 32 assigned to the hypervisor HYP, thereby performing a global management of the error signals relating to (shared) resources 106.

In a second solution, each fault collection sub-circuit 32 associated with a microprocessor 1020 may receive the error signals ERR generated for a given resource 106, thereby permitting that each microprocessor 1020 may individually monitor the error signals of the given resource.

In a third solution, one or more additional fault collection sub-circuit 32 may be associated with one or more resources 106. For example, assuming that the fault collection sub-circuit 32 monitors a given number of resources 106, such as communication interfaces or communication channels of the same resources, the additional fault collection sub-circuit 32 may comprises for each resource a respective error combination circuit 320, which thus may be assigned (via a suitable programming) to a respective virtual machine VM/microprocessor 1020.

Generally, the above solutions may also be combined in any suitable manner. For example, low-speed communication interfaces (e.g., UART) may be managed via the hypervisor, while high-speed communication interfaces (e.g., CAN or Ethernet) interface may have associated a respective error combination circuit 320 of an additional fault collection sub-circuit 32, which thus may be assigned (via a suitable programming of the access rights) to a virtual machine VM or a microprocessor 1020.

As mentioned before, the processing system 10a may also comprise one or more further fault collection sub-circuit 32, such as:
  a fault collection sub-circuit 32 configured to manage the error signals being of potential interest for the hypervisor HYP (which, e.g., may only receive a reduced set of error signals); and/or
  a fault collection sub-circuit 32 configured to collect system errors, i.e., errors common to all virtual machines VM.

Generally, the number s of error signals of the error combination circuits 320 and the number q of error combination circuits 320 of a fault collection sub-circuit 32 are thus defined during the hardware design phase of the processing system 10a.

Accordingly, in various embodiments, each error combination circuits 320 receives a respective set of error signals $ERR_1, \ldots, ERR_s$, and generates a respective combined error signals CES. As shown in FIG. 10, the combined error signals of the fault collection sub-circuit 32 are provided to the error management circuit 34. Accordingly, in the embodiment considered, the error management circuit receives the combined error signals from the fault collection sub-circuit $32_1$ (identified as $CES_{1,1}$ to $CES_{1,q}$), the combined error signals from the fault collection sub-circuit $32_2$ (identified simply as $CES_2$), etc.

For example, FIG. 10 shows, at the example of the error combination circuits $32_{01,1}$, a possible embodiment of the error combination circuits 320. Specifically, in the embodiment considered, the error combination circuit 320 comprises:
  for each error signal $ERR_1, \ldots, ERR_s$ a respective programmable error signal processing circuit 3200, i.e., error signal processing circuits $3200_1, \ldots, 3200_s$, wherein each programmable error signal processing circuit 3200 generates a respective processed error signal ERR', i.e., processed error signal $ERR'_1, \ldots ERR'_s$;
  a combinational logic circuit 3202 configured to assert the respective combined error signal CES when at least one of the processed error signals ERR' is asserted, such as one or more logic OR gates when the processed error signals ERR' and the combined error signal CES are asserted via a logic high level; and
  a register 3204 configured to store the configuration data used to program the programmable error signal processing circuit 3200.

For example, in FIG. 10, the register 3204 is connected (via a respective communication interface) to the communication system 114 and may thus be accessed via software instructions executed by a microprocessor 1020.

Figure 11:
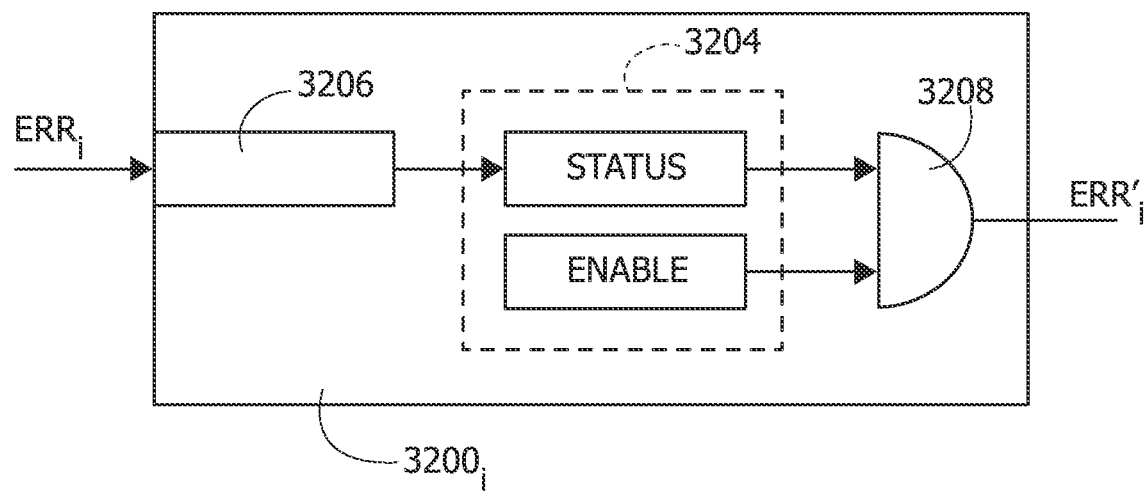
FIG. 11 shows an embodiment of a programmable error signal processing circuit used in the fault collection circuit of FIG. 10.

FIG. 11 shows a possible embodiment of a generic programmable error signal processing circuit $3200_i$ (which may be used for any of the circuits 3200) and the register 3204.

Generally, the programmable error signal processing circuit $3200i$ receives an error signal $ERR_i$ and provides a processed error signal $ERR'_i$ as a function of configuration data stored to the register 3204. Specifically, in the embodiment considered, the register 3204 comprises for each error signal processing circuit $3200_i$ two bits:
- an error status bit STATUS; and
- an enable bit ENABLE.

Specifically, in the embodiment considered, the enable bits ENABLE in the register 3204 may be written by sending a request REQ via the communication system 114. Conversely, the error status bit STATUS is asserted when the respective error signal $ERR_i$ is asserted and may be de-asserted by sending a request REQ via the communication system 114. For example, the error status bit STATUS may be implemented with a set-reset flip-flop, wherein the error signal $ERR_i$ is connected to the set input and a respective bit of a request REQ received via the communication system 114 is connected to the reset input, i.e., the bit STATUS may be implemented with a so-called write-1-clear register.

In the embodiment considered, the error status bit STATUS and the enable bit ENABLE are provided to a logic gate 3208, such as an AND gate, configured to assert the processed error signal $ERR'_i$ when both the error status bit STATUS and the enable bit ENABLE are asserted.

Optionally, the programmable error signal processing circuit $3200i$ may also comprise a synchronization circuit 3206 arranged between the error signal $ERR_i$ and the input of the status bits STATUS. For example, such a synchronization circuit 3206 may be useful to normalize the characteristics of the input triggers connected to the error combination circuit 320. For example, such a synchronization circuit 3206 may comprise a clock synchronization stage used to decouple the clock used by the respective safety monitor circuit SM from the clock used by the error combination circuit 320. For example, such a clock synchronization stage may be implemented with a plurality of flip-flops connected in cascade, wherein these flip-flops use the clock signal of the error combination circuit 320, which preferably corresponds to the clock signal used by the error management circuit 34. Generally, the synchronization circuit 3206 may also perform other operations based on the properties of the received error signal ERR, e.g., invert the logic level. Accordingly, by using the synchronization circuit 3206 and the status bit register STATUS, the characteristics of the combined error signals CES provided to the error management circuit 34 may be uniform.

Accordingly, when a given error signal ERR of the error combination circuit 320 is asserted, also the respective error status bit STATUS is asserted. Moreover, when the respective enable bit ENABLE is asserted, also the respective processed error signal ERR' is asserted, thereby also asserting via the combinational logic circuit 3202 the combined error signal CES of the error combination circuit 320.

Thus, by programming the enable bits ENABLE of the register 3204, a microprocessor 1020 may specify which errors should be signaled via the respective combined error signal CES. For example, in various embodiments, the enabled bits ENABLE are by default asserted. Conversely, by reading the error status bit STATUS of the register 3204, a microprocessor 1020 may determine which error signals ERR triggered, which may thus be used to determine which error signal ERR was asserted and asserted the combined error signal CES.

For example, due to the fact that the ENABLE bits may be used to individually enable or disable each error trigger, a processing core 102a may disable the error signals ERR of any safety monitoring circuit SM having a malfunction and having the error signal ERR always asserted. For example, in a complex clock-tree architecture, different clock monitor circuits SM may be inserted on various branches of the clock tree. The number of clock monitor circuits may be so high that it is convenient to combine the respective error signals ERR via one or more error combination circuit 320, thereby generating one or more combined error signals CES. For example, in various embodiments, clock-monitoring circuits associated specifically with a given microprocessor 1020, such as a PLL generating a clock signal, which is only provided to the respective microprocessor 1020, may be provided to the fault collection sub-circuit 32 associated with the respective microprocessor 1020. Conversely, error signals generated by clock-monitoring circuits monitoring shared clock signals (provided directly or indirectly to several microprocessors 1020, memory controllers 100 and/or resources 106) may be provided to one or more error combination circuit 320 of a dedicated fault collection sub-circuit 32, which, e.g., may be managed by the hypervisor HYP.

In case one clock monitor circuit is defective and keeps its error signal ERR stuck to 1, then the software might decide to disable the respective enable bit ENABLE, so that the combined error signal CES is not stuck to 1.

Generally, in various embodiments, one or more of the enable bits ENABLE may also always be asserted (and not be programmable), or the respective enable bits ENABLE and the respective logic gate 3208 may be omitted, i.e., the processed error signal ERR' may correspond to the error status bit STATUS. For example, in this case, safety critical errors may always be signaled. For example, this may be the case for the fault collection sub-circuit 32 managing system errors.

In various embodiments, the (programmable) enable register bits ENABLE of a given register 3204 are protected by one or more parity bits. Accordingly, the request sent by a microprocessor 1020 does not only comprise the enable register bits ENABLE but also the respective one or more parity bits.

Accordingly, in various embodiments, the error combination circuit 320 is configured to calculate, e.g., in response to given events (e.g., in response to receiving a request REQ) and/or periodically, one or more parity bits for the enable bits ENABLE stored to the register 3204 and compare the one or more calculated parity bits with the one or more parity bits received with the request. The parity scheme is set at design time and may be, e.g., 1 parity bit protecting 8 register bits, 1 parity bit protecting 16 register bits, or 1 parity bit protecting 32 register bits. Moreover, the parity can be calculated on even or odd scheme. For example, when using an odd parity scheme, the parity bit may be set to 1 when the number of bits set to 1 is even. Given the default value of the bits ENABLE in the register 3204, also the respective reset values for the parity bits are set accordingly.

As mentioned before, the one or more parity bits may be calculated in response to given events and/or periodically. For example, in various embodiments, the error combination circuit 320 is configured to calculate the parity bits when receiving a write request REQ and the calculated or received parity bits are stored to a further register. Moreover, the error combination circuit 320 is configured to re-calculate periodically, e.g., at each clock cycle, the parity bits and compare the calculated parity bits with the stored parity bits.

In case the parity data do not correspond, the error combination circuit 320 may assert an error signal, which may be provided to:
- an error signal processing circuit 3200 of the error combination circuit 320 itself; or
- an error signal processing circuit 3200 of another fault collection sub-circuit 32 collecting the parity error signals.

For example, a dedicated error combination circuit 320 may be particularly suitable, because such parity errors are safety critical. Accordingly, in this case, the error signals associated with parity errors may not be masked via the enable bits ENABLE.

Accordingly, by using a plurality of fault-collection sub-circuits 32, each virtual machine VM (possibly being executed on plural microprocessors) or each microprocessor 1020 may be associated with a respective fault-collection sub-circuit 32. For example, for this purpose, the hardware address protection circuit 1028 (such as an MMU or MPU) of each microprocessor 1020 may be programmed in order to permit access to the registers 3204 of the fault-collection sub-circuit 32 associated with the microprocessor 1020 or the virtual machine VM executed by the microprocessor 1020. Accordingly, the microprocessor 1020 may send write or read requests REQ to the registers 3204 of the respective sub-circuit 32 in order to:
- set the respective enable bits ENABLE;
- read or clear the respective status bits STATUS.

Accordingly, the microprocessor 1020 may decide which errors are signaled via the combined error signal(s) CES and may read the status bits STATUS in order to determine which error was signaled.

For example, one or more resources 106 or memory areas in a memory 104 or 104b may also be associated with each virtual machine VM. Accordingly, in various embodiments, a microprocessor 1020 executing a given virtual machine may program the enable bits ENABLE of the respective fault collection sub-circuit 32 in order to forward errors generated by the resource(s) 106 associated with the respective virtual machine VM and/or error generated by a memory controller 100 for an address range associated with the respective virtual machine VM via the respective one or more combined error signals CES.

Accordingly, in various embodiments, the error management circuit 34 is configured to generate internal reaction signals (e.g., the signals IRQ and optionally RST) and optionally external reactions (e.g., the signals ET and/or SET) as a function of the combined error signals CES and a second set of configuration data. For example, in various embodiments, the error management circuit 34 is configured to generate for each microprocessor 1020 at least one of:
- an interrupt request signal IRQ;
- a system error interrupt request signal SEI; and
- a virtual system error interrupt request signals VSEI.

In order to permit that a virtual machine VM may handle its own errors, the errors of circuits associated with a given virtual machine VM should generate an internal reaction provided to the microprocessor(s) 1020 executing the virtual machine. On the one hand, this is implemented by programming in a suitable manner the registers 3204 of the respective fault collection sub-circuit 32. On the other hand, the error management circuit 34 should correctly forward the combined error signals CES generated by a given fault-collection circuit 32 to the respective microprocessor 1020 or the microprocessors executing the respective virtual machine VM. Moreover, in various embodiments, one or more of the combined error signals CES may also relate to system errors.

Figure 12:
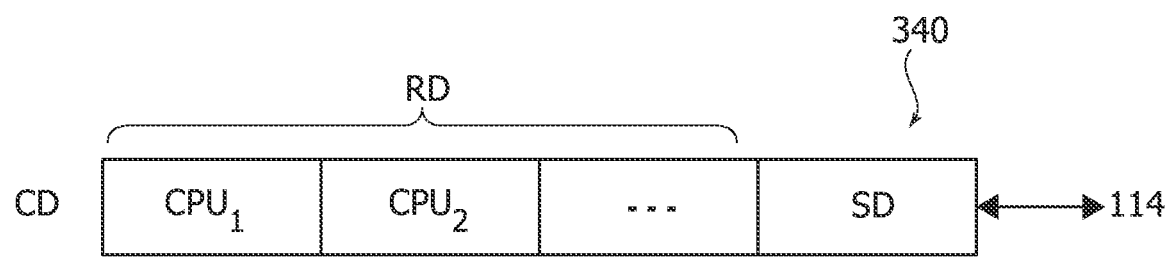
FIG. 12 shows an embodiment of the configuration data used by the error management circuit of FIG. 10.

Accordingly, as shown in FIG. 12, in various embodiments, the error management circuit 34 comprises one or more registers 340 for storing for each combined error signal CES respective configuration data CD comprising:
- routing data RD identifying to which microprocessor or microprocessors 1020 the respective combined error signal CES should be forwarded; and
- optional selection data SD identifying which internal reaction signal should be set, such as none, or one of the signals IRQ, SEI, VSEI.

Generally, in case each microprocessor 1020 is associated with a given fault collection sub-circuit 32, the routing data RD for the respective combined error signals CES may also be fixed.

However, e.g., when each virtual machine VM is associated with a respective fault collection sub-circuit 32 and/or when a plurality of microprocessor 1020 execute the same virtual machine VM, the routing data RD may also be programmable in order to selectively forward the respective combined error signal CES to the one or more microprocessor 1020 assigned to the virtual machine VM. For example, in various embodiments, the registers 340 may be connected via a respective communication interface to the communication system 114 and may thus be programmed via software instructions executed by a microprocessor 1020. In various embodiments, the registers 340 are only programmable via the hypervisor HYP, which decides which virtual machine is executed on a given micro-processor 1020.

For example, in various embodiments, the routing data RD comprise for each microprocessor 1020 of the processing system 10a a respective bit, such as bits $CPU_1$, $CPU_2$, etc., which permits the enable to which microprocessor(s) 1020 the respective combined error signals CES is forwarded. For example, this permits that all flags are set for the combined error signals CES provided by the fault collection sub-circuit 34 handling system errors.

Thus, in the embodiment considered, the hypervisor HYP may program the routing data RD in order to forward a given combined error signal CES to any microprocessor 1020 (or a plurality of microprocessors), and not necessarily to the respective microprocessor 1020 or virtual machine VM for which the error has been generated. For example, in this way, e.g., in case the microprocessor 1020 executing the virtual machine is not ASIL-D compliant, one or more of the combined error signals CES may be forwarded to another microprocessor 1020, e.g., implementing a redundant CPU, and/or to an ASIL-D compliant microprocessor, which may be internal (e.g., via an interrupt signal IRQ or another exception signal) or external (e.g., via a signal ET) with respect to the processing system 10a.

As mentioned before, the selection data SD may be used to specify which internal reaction signal should be set. For example, in various embodiments, the register 340 comprises two bits, which use the following encoding:
- "00": none of the signals IRQ, SEI and VSEI is asserted.
- "01": the signal IRQ is asserted;
- "10": the signal SEI is asserted; and
- "11": the signal VSEI is asserted.

Accordingly, in various embodiments, one or more respective internal reaction signals IRQ, SEI and/or VSEI are generated for each microprocessor 1020 of the processing system 10*a*.

Figure 13:
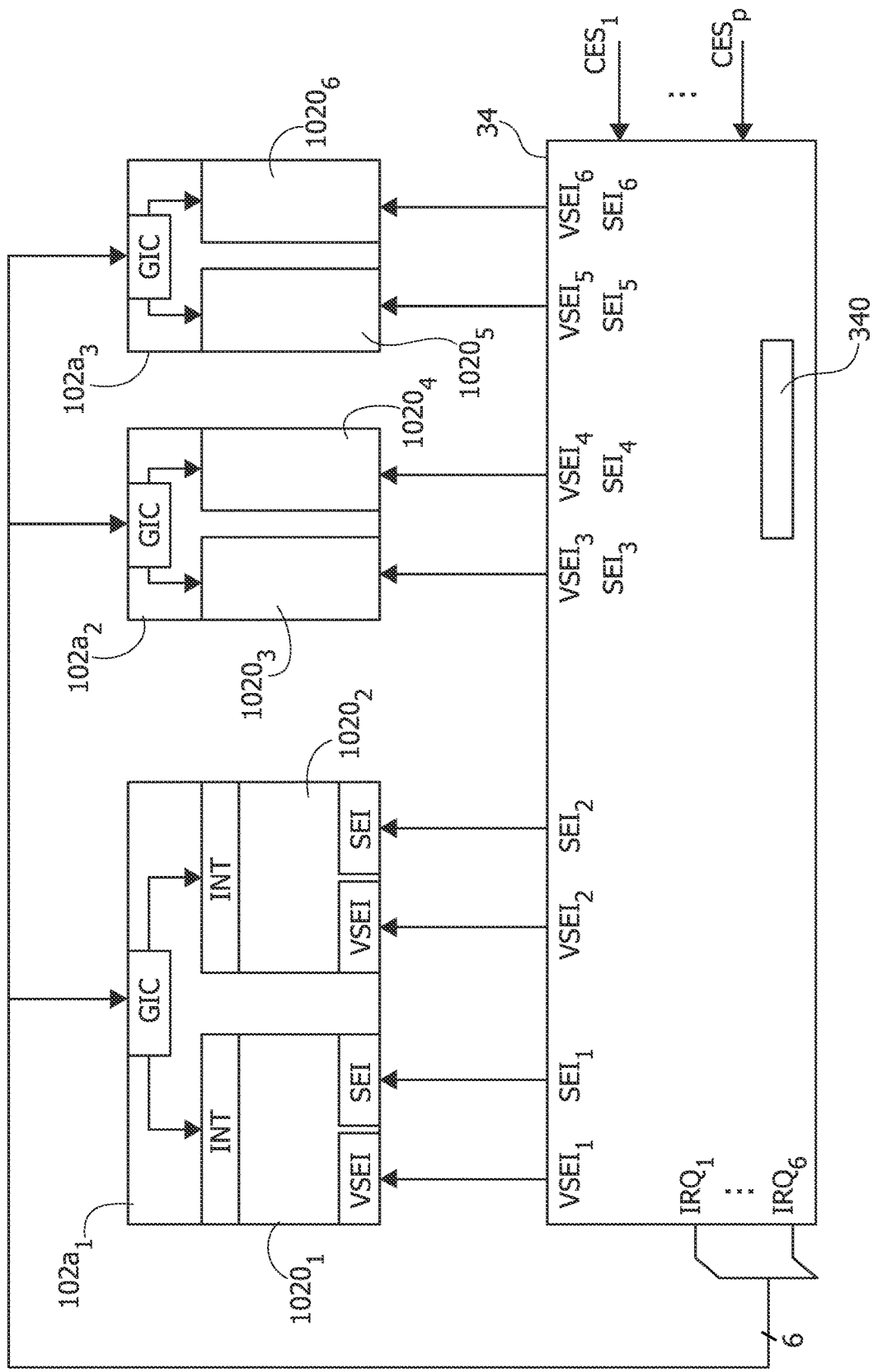
FIG. 13 shows an embodiment of the signals generated by the error management circuit of FIG. 10.

For example, FIG. 13 shows an embodiment wherein the processing system 10*a* comprises three processing cores 102*a*1, 102*a*1 and 102*a*3, wherein each processing core 102*a* comprises two microprocessors 1020, i.e., the processing system 10*a* comprises six microprocessors 1020$_1$, . . . 1020$_6$.

Specifically, in the embodiment considered, each microprocessor 1020 comprises:
- a first terminal INT for receiving a processing core interrupt request signal IRQ;
- a second terminal SEI for receiving a system error interrupt request signal SEI; and
- a third terminal VSEI for receiving a virtual system error interrupt request signal.

Accordingly, in the embodiment considered, the error management circuit 34 is configured to generate six processing core interrupt request signals IRQ (IRQ$_1$, . . . , IRQ$_6$), six system error interrupt request signals SEI (SEI$_1$, . . . , SEI$_6$) and six virtual system error interrupt request signals VSEI (VSEI$_1$, . . . , VSEI$_6$), wherein these signals are asserted as a function of the combined error signals CES$_1$, . . . , CES$_p$ received from the fault collection sub-circuits 32$_1$, . . . , 32*p*, and the configuration data CD, e.g., stored to the registers 340.

Specifically, while a respective system error interrupt request signal SEI and virtual system error interrupt request signal VSEI is provided directly to each microprocessor 1020, the interrupt request signals IRQ are provided indirectly to the microprocessors 1020. Specifically, in the embodiment considered, each processing core 102*a* comprises a Generic Interrupt Controller (GIC) interface configured to receive all interrupt request signals IRQ and selectively forward a first interrupt request signal IRQ to the terminal INT of the first microprocessor 1020 of the processing core 102*a* and second interrupt request signal IRQ to the terminal INT of the second microprocessor 1020 of the processing core 102*a*. In various embodiments, the additional routing data used to forward the processing core interrupt request signals IRQ via the CIG is programmable, preferably via the hypervisor HYP.

Accordingly, in various embodiments, an error signal ERR associated with a circuit assigned to a given virtual machine VM (or microprocessor 1020) is reported to an error combination circuit 320 of a fault collection sub-circuit 32 associated with the virtual machine VM (or microprocessor 1020). By configuring the hardware address protection circuits 1028 of the virtual machine VM (or microprocessor 1020), the respective registers 3204 are only accessible by this virtual machine VM (or microprocessor 1020). Based on the configuration of the register 3204, the error is reported via the respective combined error signals CES to the error management circuit 34. For example, the reaction of the error management circuit 34 may be pre-programmed via the hypervisor HYP, e.g., to assert the interrupt signal of a microprocessor 1020 assigned to the virtual machine VM. In response to the interrupt, the microprocessor 1020 may then read the content of the status bits of the respective fault collection sub-circuit 32 in order to determine which error signal was indeed set.

The above scenario can happen at the same time in another virtual machine, and both will be able to manage their own errors without interfering between themselves, because the registers operated by the software are allocated to different fault collection sub-circuits 32 associated to different virtual machines.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A processing system comprising:
   a plurality of microprocessors programmable via software instructions;
   a memory controller configured to read the software instructions from a non-volatile memory;
   a resource;
   a communication system connecting the microprocessors to the memory controller and the resource;
   a plurality of safety monitoring circuits configured to generate a plurality of error signals by monitoring an operation of the microprocessors, the memory controller and/or the resource;
   a fault collection and error management circuit configured to:
   receive the plurality of error signals from the plurality of safety monitoring circuits; and
   generate one or more reaction signals as a function of the plurality of error signals;
   wherein the fault collection and error management circuit comprises:
   a plurality of fault collection sub-circuits, each fault collection sub-circuit comprising one or more error combination circuits, wherein each error combination circuit comprises a first register programmable via first software instructions executed by a respective microprocessor and configured to:
   receive a subset of the error signals;
   determine whether one or more of the received error signals are asserted;
   in response to determining that one or more of the received error signals are asserted, store error status data to the first register, the error status data identifying the one or more asserted error signals;
   read enable data from the first register, the enable data specifying for each error signal whether a combined error signal should be asserted when the respective error signal is asserted; and
   generate the combined error signal as a function of the error status data and the enable data; and
   an error management circuit comprising a second register programmable via second software instructions executed by the respective microprocessor and configured to:
   receive the combined error signals from the error combination circuits;
   read routing data from the second register, the routing data specifying for each combined error signal and for each microprocessor whether an error should be signaled to the each microprocessor when the respective combined error signal is asserted; and
   generate for the each microprocessor a respective signal used to signal the error as a function of the combined error signals and the routing data.

2. The processing system according to claim 1, wherein the first register of each error combination circuit and the second register are connected to the communication system and have associated one or more respective physical addresses, and wherein each of the first register and the second register is programmable by sending a write request to the communication system comprising the respective physical address.

3. The processing system according to claim 2, comprising one or more hardware address protection circuits configured to selectively forward the write request generated by the respective microprocessor to the first registers of the respective error combination circuit and the second register as a function of virtual address translation data and/or access-rights data.

4. The processing system according to claim 3, wherein the processing system is configured to execute a hypervisor and one or more virtual machines, and wherein the hypervisor is configured to program virtual address translation data and/or access-rights data for each microprocessor and/or virtual machine.

5. The processing system according to claim 4, wherein each microprocessor has associated a register for storing a Virtual Machine identification (ID), wherein the respective hardware address protection circuit is configured to use virtual address translation data and/or access-rights data as a function of the Virtual Machine ID stored to the register associated with the each microprocessor, and wherein the hypervisor is configured to:
associate with each virtual machine a respective Virtual Machine ID;
program for each Virtual Machine ID respective virtual address translation data and/or access-rights data;
determine for the each microprocessor whether a respective virtual machine should be executed; and
in response to determining that the respective virtual machine should be executed on one of the microprocessors, program the respective Virtual Machine ID to the register associated with a selected microprocessor and start the respective virtual machine on the selected microprocessor.

6. The processing system according to claim 4, wherein the processing system is configured to permit access to the routing data stored to the second register only via the microprocessor executing the hypervisor.

7. The processing system according to claim 4, wherein the plurality of fault collection sub-circuits comprises a fault collection sub-circuit associated with the hypervisor, wherein the processing system is configured to permit access to the first registers of the one or more error combination circuits of the fault collection sub-circuit associated with the hypervisor only via the microprocessor executing the hypervisor.

8. The processing system according to claim 7, wherein the one or more error combination circuits of the fault collection sub-circuit associated with the hypervisor are configured to receive system error signals and/or error signals generated by one or more safety monitoring circuits configured to monitor an operation of one or more first resources.

9. The processing system according to claim 1, wherein the plurality of fault collection sub-circuits comprises for each microprocessor a respective fault collection sub-circuit comprising the one or more respective error combination circuits configured to receive the error signals generated by one or more safety monitoring circuits configured to monitor the operation of the respective microprocessor.

10. The processing system according to claim 9, wherein one or more of the error combination circuits of the respective fault collection sub-circuit associated with a respective microprocessor are configured to receive the error signals generated by the one or more safety monitoring circuits configured to monitor an operation of one or more second resources and/or memory areas associated with the respective microprocessor.

11. The processing system according to claim 9, wherein:
the processing system is configured to execute a hypervisor and one or more virtual machines, and wherein the hypervisor is configured to program virtual address translation data and/or access-rights data for each microprocessor and/or virtual machine; and
the hypervisor is configured to program the virtual address translation data and/or access-rights data, such that each microprocessor can access the first registers of the one or more error combination circuits of the fault collection sub-circuit associated with the each microprocessor.

12. The processing system according to claim 9, wherein:
the processing system is configured to execute a hypervisor and one or more virtual machines, and wherein the hypervisor is configured to program virtual address translation data and/or access-rights data for each microprocessor and/or virtual machine; and
the hypervisor is configured to program the routing data stored to the second register in order to forward the combined error signals generated by the one or more error combination circuits of the respective fault collection sub-circuit associated with the each microprocessor to the each microprocessor.

13. The processing system according to claim 1, wherein the processing system is disposed on an integrated circuit.

14. A device comprising:
a further communication system; and
a plurality of processing systems connected via the further communication system, wherein each of the processing systems comprises:
a plurality of microprocessors programmable via software instructions;
a memory controller configured to read the software instructions from a non-volatile memory;
a resource;
a communication system connecting the microprocessors to the memory controller and the resource;
a plurality of safety monitoring circuits configured to generate a plurality of error signals by monitoring an operation of the microprocessors, the memory controller and/or the resource;
a fault collection and error management circuit configured to:
receive the plurality of error signals from the plurality of safety monitoring circuits; and
generate one or more reaction signals as a function of the plurality of error signals;
wherein the fault collection and error management circuit comprises:
a plurality of fault collection sub-circuits, each fault collection sub-circuit comprising one or more error combination circuits, wherein each error combination circuit comprises a first register programmable via first software instructions executed by a respective microprocessor, and configured to:
receive a subset of the error signals;
determine whether one or more of the received error signals are asserted;
in response to determining that one or more of the received error signals are asserted, store error status data to the first register, the error status data identifying the one or more asserted error signals;

read enable data from the first register, the enable data specifying for each error signal whether a combined error signal should be asserted when the respective error signal is asserted; and generate the combined error signal as a function of the error status data and the enable data; and an error management circuit comprising a second register programmable via second software instructions executed by the respective microprocessor and configured to:

receive the combined error signals from the error combination circuits;

read routing data from the second register, the routing data specifying for each combined error signal and for each microprocessor whether an error should be signaled to the each microprocessor when the respective combined error signal is asserted; and generate for the each microprocessor a respective signal used to signal the error as a function of the combined error signals and the routing data.

15. The device of claim 14, wherein the device is a vehicle.

16. A method of operating a processing system comprising a plurality of microprocessors programmable via software instructions, a memory controller configured to read the software instructions from a non-volatile memory, a resource, a communication system connecting the microprocessors to the memory controller and the resource, a plurality of safety monitoring circuits configured to generate a plurality of error signals by monitoring an operation of the microprocessors, the memory controller and/or the resource, a fault collection and error management circuit comprising a plurality of fault collection sub-circuits, each fault collection sub-circuit comprising one or more error combination circuits, each error combination circuit comprising a first register programmable via first software instructions executed by a respective microprocessor, and the fault collection and error management circuit comprising an error management circuit comprising a second register programmable via second software instructions executed by the respective microprocessor, the method comprising:

programming enable data to one or more of the first registers of the one or more error combination circuits;

programming routing data to the second register of the error management circuit;

receiving, by the fault collection and error management circuit, the plurality of error signals from the plurality of safety monitoring circuits;

generating, by the fault collection and error management circuit, one or more reaction signals as a function of the plurality of error signals;

receiving, by each error combination circuit, a subset of the error signals;

determining, by each error combination circuit, whether one or more of the received error signals are asserted;

in response to determining that one or more of the received error signals are asserted, storing, by each error combination circuit, error status data to the first register, the error status data identifying the one or more asserted error signals;

reading, by each error combination circuit, the enable data from the first register, the enable data specifying for each error signal whether a combined error signal should be asserted when the respective error signal is asserted;

generating, by each error combination circuit, the combined error signal as a function of the error status data and the enable data;

receiving, by the error management circuit, the combined error signals from the error combination circuits;

reading, by the error management circuit, the routing data from the second register, the routing data specifying for each combined error signal and for each microprocessor whether an error should be signaled to the each microprocessor when the respective combined error signal is asserted; and generating, by the error management circuit, for the each microprocessor a respective signal used to signal the error as a function of the combined error signals and the routing data.

17. The method according to claim 16, wherein the first register of each error combination circuit and the second register are connected to the communication system and have associated one or more respective physical addresses, and the method further comprises:

programming each of the first register and the second register by sending a write request to the communication system comprising the respective physical address.

18. The method according to claim 17, wherein the processing system comprises one or more hardware address protection circuits, and the method further comprises:

selectively forwarding, by the one or more hardware address protection circuits, the write request generated by the respective microprocessor to the first registers of the respective error combination circuit and the second register as a function of virtual address translation data and/or access-rights data.

19. The method according to claim 16, wherein the plurality of fault collection sub-circuit comprises for each microprocessor a respective fault collection sub-circuit comprising the one or more respective error combination circuits, and the method further comprises:

receiving, by each respective fault collection sub-circuit, the error signals generated by one or more safety monitoring circuits configured to monitor the operation of the respective microprocessor.

20. The method according to claim 19, further comprising:

receiving, by the one or more of the error combination circuits of the respective fault collection sub-circuit associated with a respective microprocessor, the error signals generated by the one or more safety monitoring circuits; and monitoring, by the one or more safety monitoring circuits, an operation of one or more second resources and/or memory areas associated with the respective microprocessor.

* * * * *